(12) United States Patent
Siegel et al.

(10) Patent No.: US 8,671,340 B1
(45) Date of Patent: Mar. 11, 2014

(54) CALCULATING AND VISUALIZING THE AGE OF CONTENT

(75) Inventors: Hilliard Bruce Siegel, Seattle, WA (US); Murray Chapman, Seattle, WA (US)

(73) Assignee: IMDb.com, Inc., Seattle, WA (US)

( * ) Notice: Subject to any disclaimer, the term of this patent is extended or adjusted under 35 U.S.C. 154(b) by 0 days.

(21) Appl. No.: 13/349,034

(22) Filed: Jan. 12, 2012

(51) Int. Cl.
    *G06F 17/00* (2006.01)
(52) U.S. Cl.
    USPC .......................................... 715/234
(58) Field of Classification Search
    USPC ................ 715/234, 273, 229, 207, 204
    See application file for complete search history.

(56) References Cited

U.S. PATENT DOCUMENTS

| | | | |
|---|---|---|---|
| 6,445,400 B1* | 9/2002 | Maddalozzo et al. | 715/803 |
| 7,290,213 B2* | 10/2007 | Kake et al. | 715/738 |
| 7,584,185 B2* | 9/2009 | Jatowt et al. | 1/1 |
| 7,584,294 B2* | 9/2009 | Plamondon | 709/233 |
| 7,752,534 B2* | 7/2010 | Blanchard et al. | 715/204 |
| 7,945,866 B2* | 5/2011 | Dunko et al. | 715/867 |
| 2007/0277102 A1* | 11/2007 | Kanzaki | 715/540 |
| 2008/0250060 A1* | 10/2008 | Grois | 707/102 |
| 2009/0083217 A1* | 3/2009 | Levow | 707/2 |
| 2010/0223578 A1* | 9/2010 | Huberman et al. | 715/810 |
| 2012/0197901 A1* | 8/2012 | Wilson | 707/747 |
| 2012/0209795 A1* | 8/2012 | Glickman | 706/12 |

\* cited by examiner

*Primary Examiner* — Laurie Ries
(74) *Attorney, Agent, or Firm* — Hope Baldauff, LLC

(57) ABSTRACT

Age data is calculated and stored that describes the age of one or more elements in a Web page, such as images or hyperlinks. The age data may be utilized to modify the Web page such that the age of each Web page element is visually presented when the Web page is rendered. For example, the Web page may be configured such that a region is overlaid upon each element that is colored or shaded based upon the age of the element. Colored or shaded borders might also be applied to the Web page elements that indicate the age of each Web page element. The age data might also be utilized to modify the Web page such that the frequency at which each page element has been changed will be visually presented when the Web page is rendered. The age data might also be correlated to other Web page statistics.

20 Claims, 10 Drawing Sheets

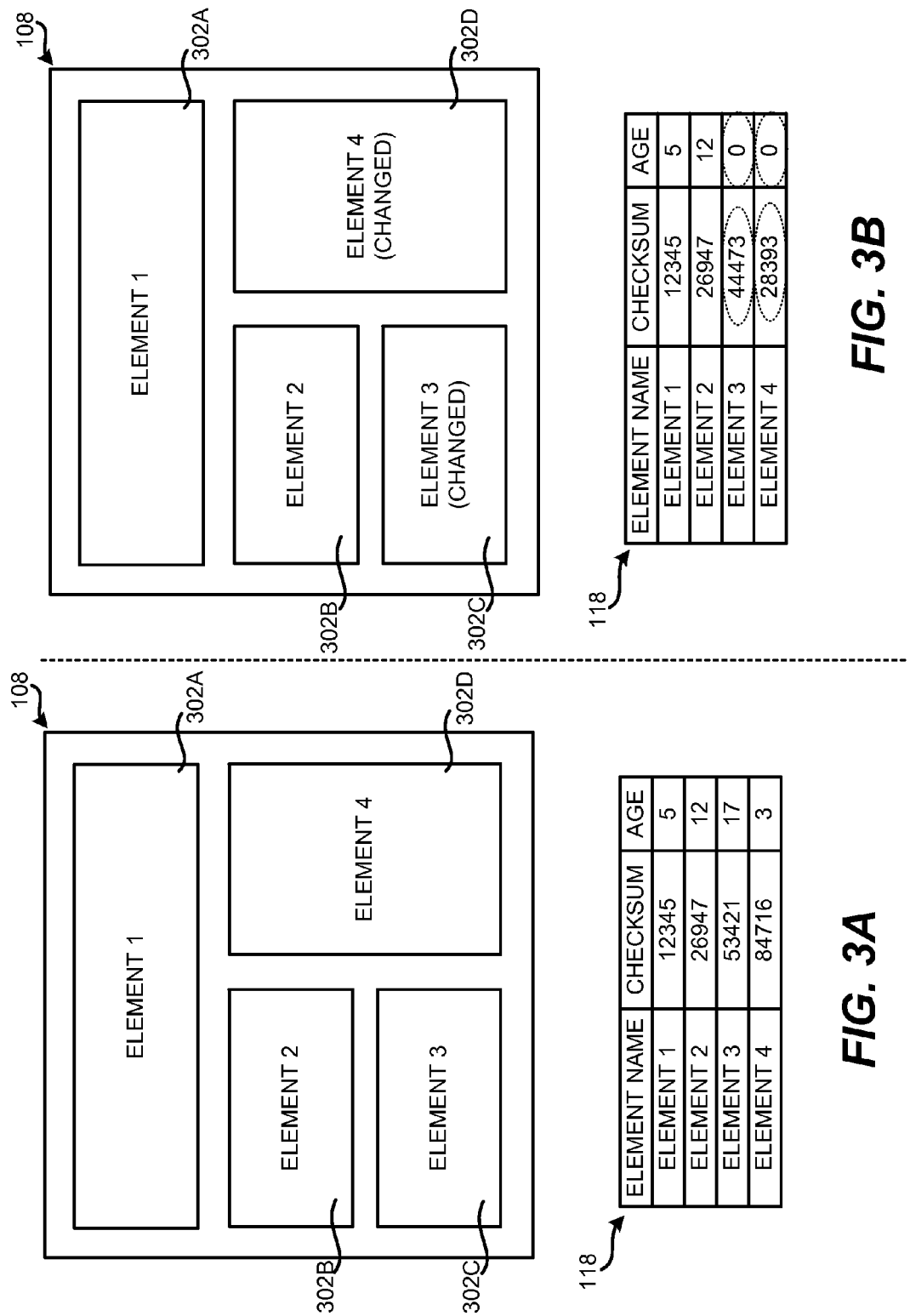

CALCULATING AND VISUALIZING THE AGE OF CONTENT

BACKGROUND

The "freshness" of the content provided by many types of World Wide Web ("Web") sites may correlate directly to a Web site's ability to attract new and repeat viewers and to obtain a high ranking in relevant search results. The term "freshness" refers to the age of the content provided on a Web page. Newer content on a Web page might be described as being "fresh", while older content on a Web page might be described as being "stale."

Although providing fresh content is very important for certain types of Web sites, it can sometimes be difficult for Web site developers to determine the freshness of content on particular Web pages. For instance, a Web site developer might make changes to one or more back-end Web site components that change how and/or when content is presented on a certain Web page. It may be difficult for the Web site developer to know how these types of changes affect the freshness of the content that appears on the Web page.

It is with respect to these and other considerations that the disclosure made herein is presented.

BRIEF DESCRIPTION OF THE DRAWINGS

FIGS. 3A-3B are Web page and data structure diagrams showing an illustrative Web page along with corresponding age data for elements generated by the Web page, according to one embodiment disclosed herein;

DETAILED DESCRIPTION

Figure 1:
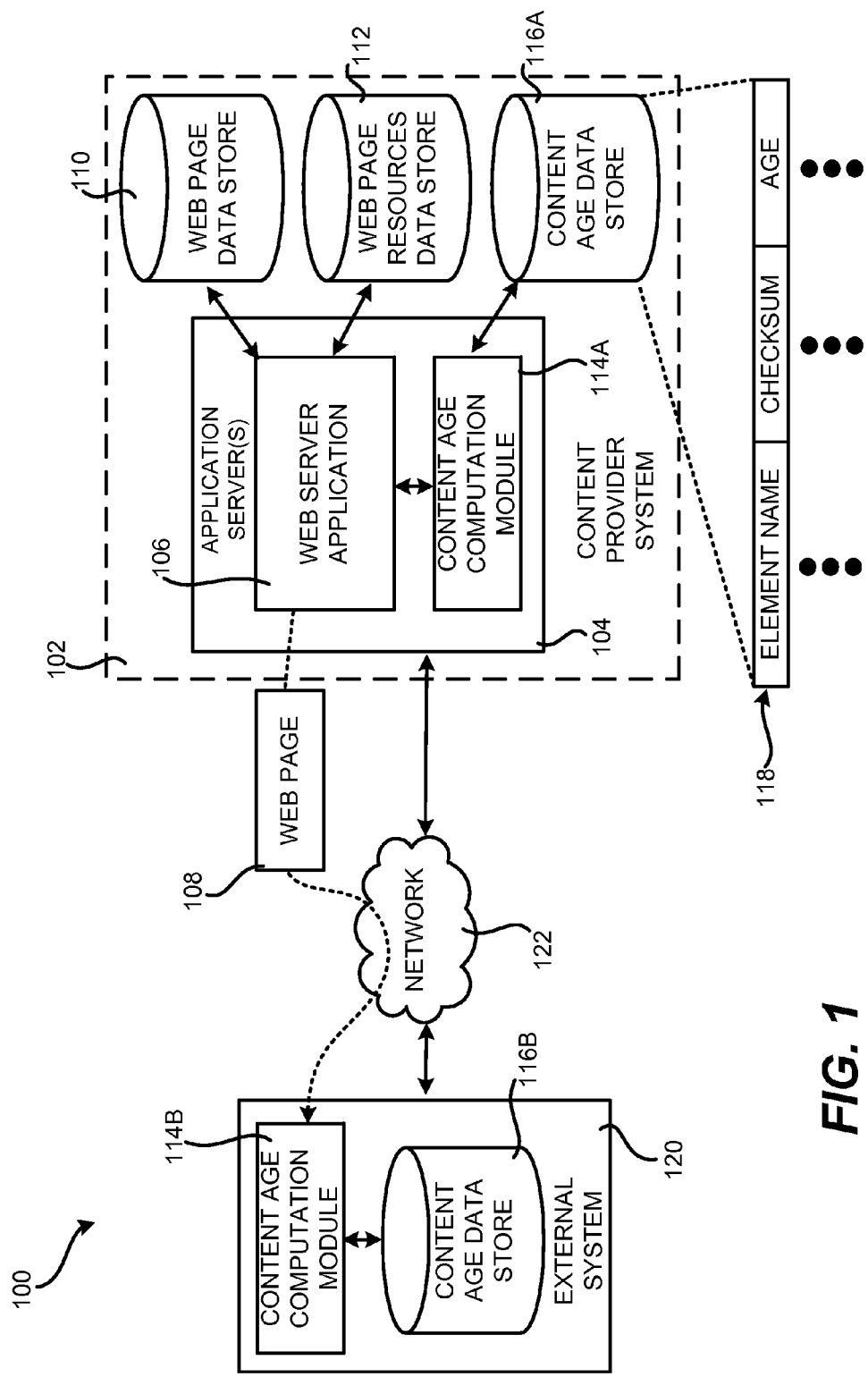
FIG. 1 is a system diagram showing an illustrative configuration for a content provider system that is configured to compute the age of Web page content, according to one embodiment disclosed herein.

The following detailed description is directed to technologies for calculating and visualizing the age of content, such as content presented on a Web page. Through an implementation of the concepts and technologies disclosed herein, age data is computed that indicates the age of various elements on a Web page, such as text, images, hyperlinks, and other types of Web page elements. When a request is received for the Web page, the age data may be utilized to modify the Web page such that the age of each element on the Web page is presented visually when the Web page is rendered. For example, newer elements on a Web page may be colored green and older elements may be colored red. In this way, a Web site developer or other viewer of the Web page can quickly determine the freshness of the content on the Web page.

According to one embodiment disclosed herein, a content provider system is configured to execute a content age computation module. The content age computation module is configured to calculate the age of elements displayed by Web pages. For example, the content age computation module might compute the age of text, images, videos, hyperlinks, and/or other types of elements displayed by a Web page. The content age computation module might compute the age of the elements displayed by a Web page periodically (e.g. every minute, hour, day, etc.) or might compute the age of the elements presented by the Web page at the time a request for the Web page is received. The content age computation module might also store age data that describes the age of the Web page elements.

According to various embodiments, the content age computation module might be configured to determine the age of each Web page element by first detecting whether the element has changed. For example, in one embodiment, the content age computation module might generate and store a checksum for each Web page element for which age is to be tracked. Subsequently, the content age computation module might re-compute the checksum for each element. The previously stored checksums might then be compared to the re-computed checksums to determine if each element has changed (i.e. an element has changed if the checksum has changed). Other mechanisms might be utilized to determine whether Web page elements have changed, such as a direct comparison of the elements, manual examination of the elements, and others.

The age of each element that has not changed may be incremented. For example, if the age of Web page elements is updated each day, and an element has not changed since the last update, the age of the element may be updated by one day. The age of elements that have changed may be reset. In this manner, the age of elements in a Web page may be determined, and age data describing the age of the elements may be stored. Other mechanisms might also be utilized to determine the age of Web page elements, such as updating a time/date stamp each time an element is modified.

According to other aspects presented herein, the age data might also be utilized to present a Web page that indicates the age of each of the elements in the Web page. For instance, in one embodiment, the content provider system might receive a request for a Web page. In response to receiving such a request, the ages of the elements in the Web page may be calculated and/or retrieved from previously generated age data. Once the ages of the elements have been generated or retrieved, the ages may be utilized to modify the requested Web page such that the ages will be visually presented when the Web page is rendered at a client device.

In one embodiment, the Web page is modified such that the elements themselves will be colored and/or shaded based upon their age. For instance, newer elements may be colored green while older elements are colored red. In other embodiments, a rectangle or region having another shape may be placed around or on top of each element that is colored and/or shaded based upon the age of the element that the shape encompasses. Virtually any number of colors and/or shades of colors might be utilized to indicate a range of ages of the elements. A Web page might also be modified to provide other types of visual indications of the age of each of the elements contained therein.

In other embodiments, a Web page is modified such that the frequency that each element in the page has been updated is visually presented when the Web page is rendered at a client device. For example, the elements themselves may be colored and/or shaded based upon the frequency at which they have been updated. In other embodiments, a rectangle or region having another shape may be placed around or on top of each element that is colored and/or shaded based upon the frequency at which the element that the shape encompasses has been updated. Virtually any number of colors and/or shades of colors might be utilized to indicate a range of update frequencies. A Web page might also be modified to provide other types of visual indications of the frequency at which the elements in the page have been updated.

According to other embodiments, the age data might also be correlated to other statistics regarding elements in the Web page. For example, the average age of elements within an area (e.g. left, right, top, bottom) of a Web page may be computed using the age data. The average age of elements within the area may then be correlated with data describing the number of clicks that the area received within a particular period. An assertion may then be tested using the correlated data. For instance, a determination may be made as to whether areas with content having lower or higher average ages are likely to receive a greater number of clicks. Other types of correlations may be made and other types of assertions might also be tested in other embodiments. Additional details regarding these and other aspects of the various concepts and technologies presented herein will be provided below with regard to FIGS. 1-9.

It should be appreciated that the embodiments disclosed herein might be utilized with any type of computer, computing system, device, Web site, application program, operating system, or other type of system or component. Accordingly, although the embodiments disclosed herein are primarily presented in the context of a content provider system that embodies the concepts disclosed herein for calculating and visualizing the age of content, the disclosure presented herein is not limited to such an implementation. Additionally, although the embodiments described herein are primarily presented in the context of visualizing attributes of elements in a Web page, it should be appreciated that the embodiments disclosed herein might be utilized with other types of content that are accessible through a computer system. For instance, the embodiments disclosed herein might be utilized to display the age and/or update frequency of elements in pages presented by mobile and desktop applications. Accordingly, it should be appreciated that the embodiments disclosed herein are not limited to Web pages and might be utilized in conjunction with any type of visually perceptible or audible data.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment 100 in which aspects of the various embodiments described herein may be implemented. In particular, FIG. 1 is a system diagram showing an illustrative configuration for a content provider system 102 that is configured to compute and store data describing the age of Web page content, according to one embodiment disclosed herein. The configuration of the environment 100 is merely illustrative and the embodiments disclosed herein might be utilized in many different types of environments.

The environment 100 comprises a content provider system 102 that includes a number of application servers 104. The application servers 104 may be implemented as standard server computers, database servers, Web servers, network appliances, desktop computers, other computing devices, and/or any combination thereof. The application servers 104 may execute a number of modules in order to perform the various functions described herein. The modules may execute on a single application server 104 or in parallel across multiple application servers in the content provider system 102. In addition, each module may consist of a number of subcomponents executing on different application servers 104 or other computing devices in the content provider system 102. The modules may be implemented as software, hardware, or any combination of the two.

As illustrated in FIG. 1, at least one of the application servers 104 is configured to execute a Web server application 106. As known to those skilled in the art, a Web server application 106 is an executable program that is configured to receive and respond to requests for Web pages, such as the Web page 108, and other content referenced by Web pages. The Web server application 106 may be one of any number of Web server applications publicly available and known to those skilled in the art.

In one embodiment, the Web server application 106 is configured to serve Web pages 108 stored in a Web page data store 110. The Web pages 108 may be pre-stored in the Web page data store 110 or might be dynamically generated in response to requests for the Web pages 108. As known in the art, Web pages may be documents, files, or other data structures containing hypertext markup language ("HTML"), extensible markup language ("XML"), JavaScript or other types of script or code, and other markup and/or scripting code that instruct a Web browser application how to render the contents of the Web page. The Web pages 108 might be generated using data stored in a Web page resources data store 112. The Web page resources stored in the data store 112 might include, for instance, program code for generating Web pages, metadata, scripts, executable code, and other types of data utilized to create and/or provide a Web page 108. Files referenced by a Web page 108 might be stored in the content provider system 102 or in other computer systems.

As appreciated by those skilled in the art, Web pages 108 served by the Web server application 106 typically include one or more visual Web page elements when rendered. As used herein, the term Web page element (or simply "element") refers to items that are displayed when a Web page 108 is rendered. For example, Web page elements might include, but are not limited to, text, hyperlinks, buttons, images, tables, videos, and/or other types of textual, non-textual, or interactive elements presented when a Web page 108 is rendered. As will be described in detail below, the content provider system 102 is configured to track the age of Web page elements and to provide functionality for visualizing the age of the Web page elements.

In order to compute the age of Web page elements, the content provider system 102 is configured in one embodiment to execute a content age computation module 114A (which may be referred to as "the module 114A"). The content age computation module 114A is a software component that executes on one or more of the application servers 104. The content age computation module 114A computes age data 118 that describes the age of Web page elements and stores the age data 118 in the content age data store 116A. The age data 118 may be generated periodically, such as for instance once every minute, hour, day, week, month, etc. Alternately, the age data 118 might be generated at the time a request for a Web page 108 is received at the Web server application 106.

The content age computation module 114A is configured in one embodiment to determine the age of each Web page element by first detecting whether each element has changed. For example, in one embodiment, the content age computation module 114A might generate and store a checksum in the age data 118 for each Web page element for which age is to be tracked. Subsequently, the content age computation module 114A might re-compute the checksum for each element. The previously stored checksums stored in the content age data store 116A might then be compared to the re-computed checksums to determine if each element has changed (i.e. an element has changed if the checksum has changed). The content age computation module 114A might also utilize other mechanisms to determine whether Web page elements have changed, such as a direct comparison of the elements.

After determining whether each Web page element has changed, the content age computation module 114A is configured to increment the age of each element that has not changed in the age data 118. For example, if the age of Web page elements is updated each day, and a particular Web page element has not changed since the last update, the content age computation module 114A might increment the age of the element by one day in the age data 118. The content age computation module 114A might reset the age of any Web page elements that have changed since the last time the checksum was computed. In this manner, the age of elements in a Web page may be calculated, and age data 118 describing the age of the elements may be stored in the content age data store 116A. Other mechanisms might also be utilized to determine the age of Web page elements, such as updating a time/date stamp each time an element is modified.

It should be appreciated that the content age computation module 114A need not be executed at the content provider system 102. For instance, as illustrated in FIG. 1, the content age computation module 114B might be executed at another computer system, such as the external system 120. The external system 120 is connected to the content provider by way of the network 122. The network 122 may represent one or more of a local-area network ("LAN"), a wide-area network ("WAN"), the Internet, or any other networking topology known in the art that may be used to interconnect a content provider system 102 and one or more other computing systems, such as the external system 120.

When the content age computation module 114B is executed at the external system 120, the content age computation module 114B may periodically transmit a request for a Web page 108 to the content provider system 102. In response to receiving the request, the content provider system 102 will provide the requested Web page 108. In response to receiving the Web page 108 from the content provider system 102, the content age computation module 114B determines the age of the Web page elements generated by the Web page 108 in the manner described above.

The content age computation module 114B may then store age data in the content age data store 116B at the external system 120 that describes the age of the Web page elements. The external system 120 may repeat this process periodically so that the content age data store 116B at the external system 120 contains up-to-date information regarding the age of the Web page elements. As will be discussed in detail below with regard to FIG. 4, a client device might request the age data from the external system 120 in one embodiment, and utilize the age data to generate a Web page that includes a visual representation of the age of each of the Web page elements. Because the modules 114A and 114B perform the same functionality, as described above and below, these modules may be referred to generically as "the module 114." For similar reasons, the content age data stores 116A and 116B might also be referred to as "the content age data store 116."

Figure 2A:
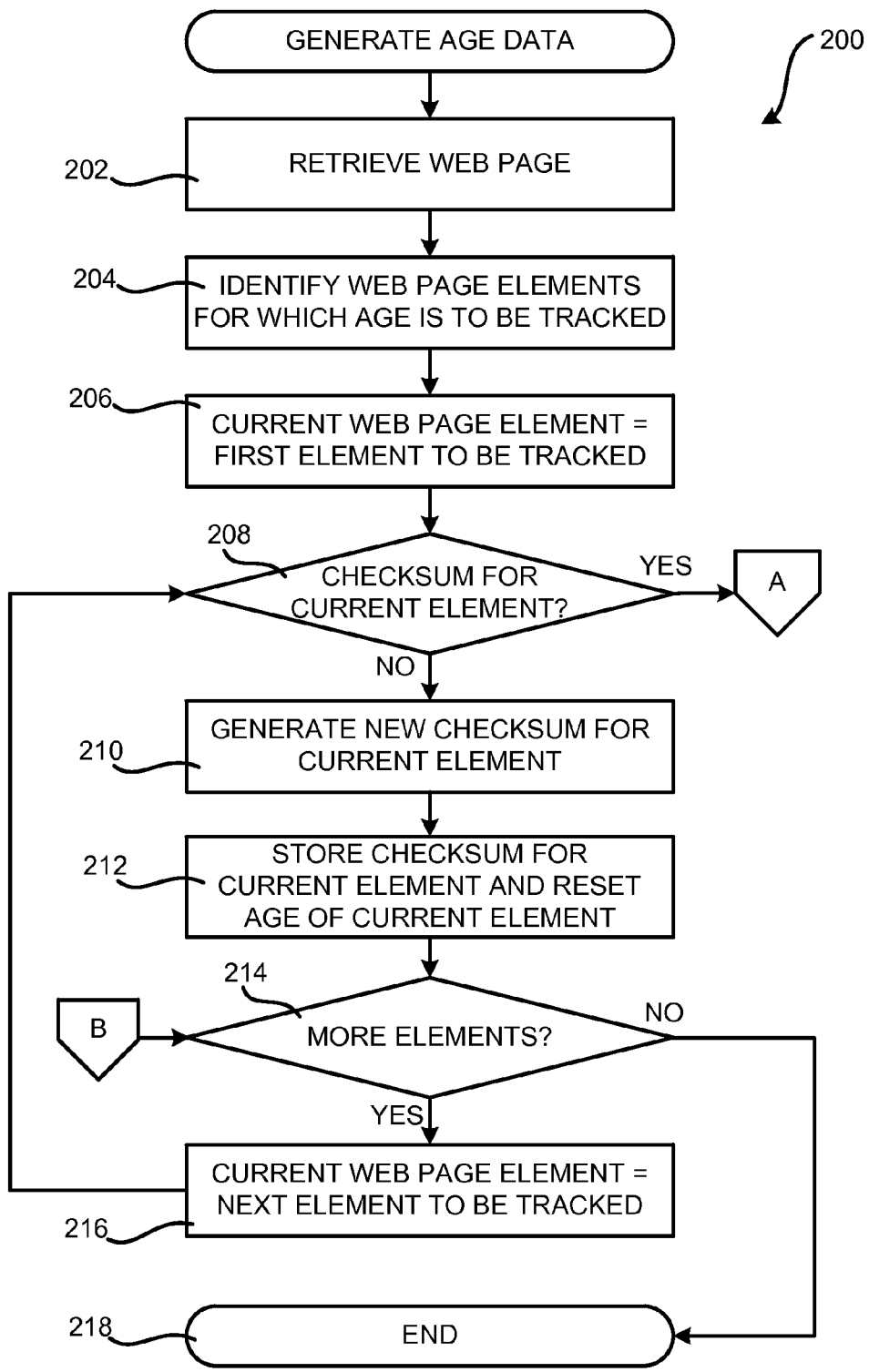
FIGS. 2A-2B are flow diagrams showing aspects of one illustrative routine for computing the age of Web page content, according to one embodiment disclosed herein.
Figure 2B:
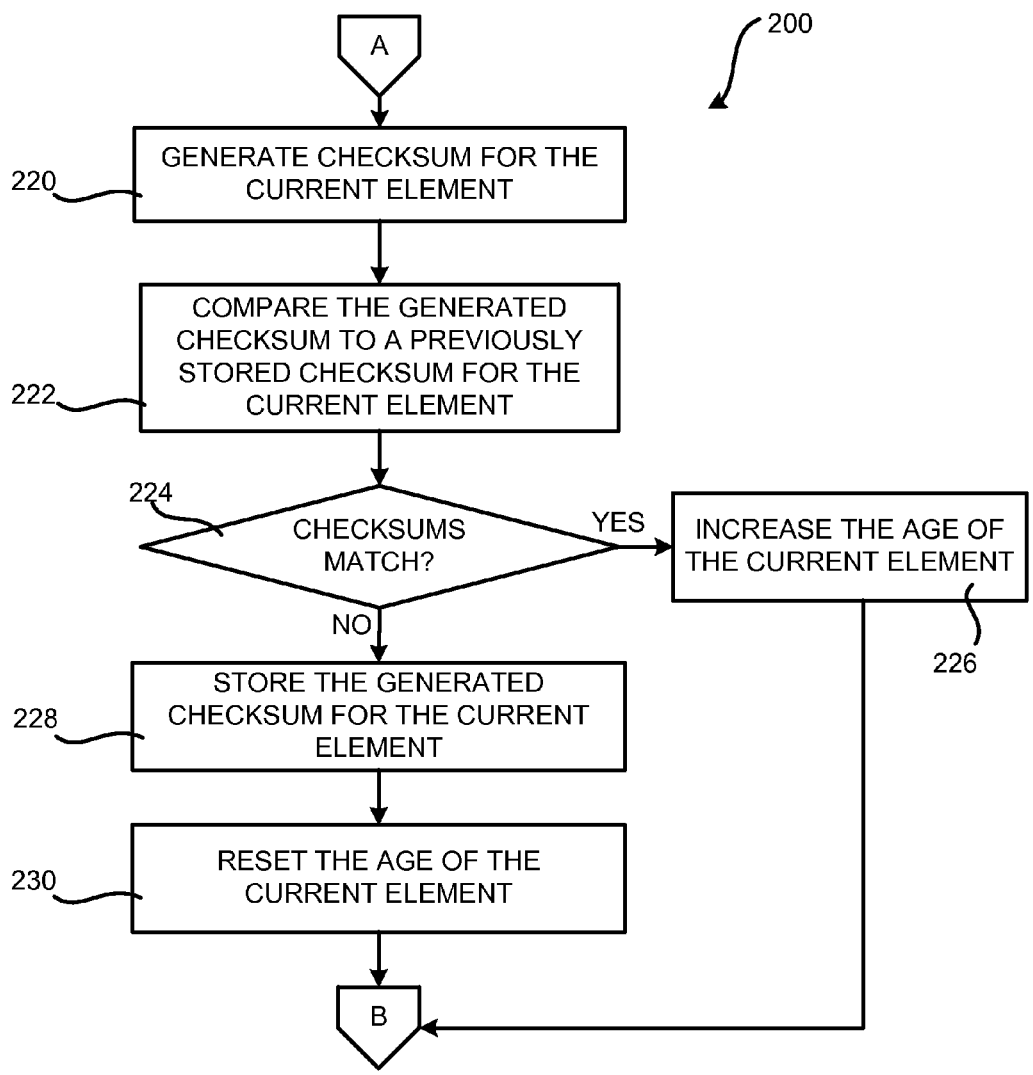

Turning now to FIGS. 2A-2B, additional details will be provided regarding the embodiments described herein for calculating the age of Web page elements. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 2A-2B are flow diagrams showing aspects of one illustrative routine 200 for computing the age of Web page content, according to one embodiment disclosed herein. In the embodiment shown in FIGS. 2A-2B, the content age computation module 114 utilizes checksums to determine whether Web page elements have changed. As discussed above, however, the content age computation module 114 might utilize other mechanisms to determine whether Web page elements have changed and to determine the age of the Web page elements.

The routine 200 begins at operation 202, where the module 114 requests a Web page 108 from the Web server application 106 for which the age of elements generated thereby are to be tracked. In response to the request, the Web server application 106 provides the requested Web page 108 to the module 114. The routine 200 then proceeds to operation 204, where the module 114 identifies the Web page elements in the Web page 108 for which age is to be tracked. According to one embodiment, the age of all of the Web page elements generated by the Web page 108 is tracked. In other embodiments, the particular elements of a Web page 108 for which age is to be tracked may be specified in the Web page 108 itself. As an example, a custom HTML attribute may be inserted into each HTML tag that should have its age tracked. The module 114 may search the Web page 108 for the custom HTML attributes and track the ages of those tags having the proper attribute specified. Other mechanisms might also be utilized to specify to the module 114 the particular Web page elements that are to be tracked.

Once the Web page elements for which age is to be tracked have been identified, the routine 200 proceeds from operation 204 to operation 206. At operation 206, a variable is initialized to keep track of the current Web page element. The routine 200 then proceeds to operation 208 where the module 114 determines whether a checksum exists in the age data 118 for the current Web page element. A checksum might not exist for the current Web page element if the element has been newly added to the Web page 108 or if the module 114 has not previously determined the age of the Web page elements generated by the Web page 108.

If no checksum exists for the current Web page element, the routine 200 proceeds from operation 208 to operation 210. At operation 210, the module 114 generates a new checksum for the current Web page element. Various checksum algorithms known to those in the art might be utilized to generate the checksum, such as a longitudinal parity check, a module sum, or position-dependent checksums. Other algorithms might also be utilized. Once the checksum has been generated, the routine 200 proceeds to operation 212 where the generated checksum is stored in the age data 118. The age of the current Web page element is also set to zero in the age data 118.

From operation 212, the routine 200 proceeds to operation 214, where the module 114 determines whether additional Web page elements remain in the Web page 108 to be processed. If no additional Web page elements remain to be processed, the routine 200 proceeds from operation 214 to operation 218, where it ends. If additional Web page elements remain to be processed, the routine 200 proceeds from operation 214 to operation 216. At operation 216, the variable utilized to identify the current Web page element is incremented. The routine 200 then proceeds back to operation 208, described above.

If, at operation 208, the module 114 determines that a checksum already exists in the age data 118 for the current Web page element, the routine 200 proceeds from operation 208 to operation 220 (shown in FIG. 2B). At operation 220, the module 114 re-generates the checksum for the current Web page element. The routine 200 then proceeds to operation 222, where the module 114 compares the newly generated checksum to the checksum for the Web page element stored in the content age data store 116.

If the newly generated and stored checksums match at operation 224, this indicates that the Web page element has not changed since the time the stored checksum was generated. Accordingly, in this case, the routine 200 proceeds from operation 224 to operation 226, where the age of the current Web page element is incremented in the age data 118. For example, if the process described above is performed once per minute, the age of the current Web page element may be increased by one minute. If the process described above is performed once per day, the age of the current Web page element may be increased by one day.

If the newly generated and stored checksums do not match, this indicates that the Web page element has changed since the time the stored checksum was generated. Accordingly, in this case, the routine 200 proceeds from operation 224 to operation 228, where the newly generated checksum for the current Web page element is stored in the age data 118 to replace the previously stored checksum. The routine 200 then proceeds from operation 228 to operation 230, where the age of the current Web page element is reset to zero in the age data 118. From operations 226 and 230, the routine 200 proceeds to operation 214, where the age of other Web page elements may be computed in the manner described above.

As mentioned previously, the mechanism shown in FIGS. 2A-2B and described above for computing the age of Web page elements is merely illustrative. Other mechanisms might also be utilized to calculate and store data describing the age of Web page elements. For example, time stamps might be associated with Web page elements and updated each time the Web page elements are modified. Other mechanisms might also be utilized.

FIGS. 3A-3B are Web page and data structure diagrams showing an illustrative Web page 108 along with corresponding age data 118 for Web page elements generated by the Web page 108, according to one embodiment disclosed herein. In FIG. 3A, the Web page 108 has been rendered, thereby showing Web page elements 302A-302D. The process described above with regard to FIGS. 2A-2B has also been performed, thereby generating the age data 118 shown in FIG. 3A. As shown in FIG. 3A, a name has been assigned to each Web page element 302A-302D, a checksum has been computed for each Web page element 302A-302D, and the age of each Web page element 302A-302D has been computed and stored in the age data 118.

FIG. 3B shows the Web page 108 of FIG. 3A following a subsequent computation of the age of the Web page elements 302A-302D. In the example shown in FIG. 3B, the Web page elements 302C and 302D have changed since the previous age computation. Consequently, the age data 118 has been updated with new checksums for the Web page elements 302C and 302D in the manner described above. Additionally, the stored ages for the Web page elements 302C and 302D have been reset.

Figure 4:
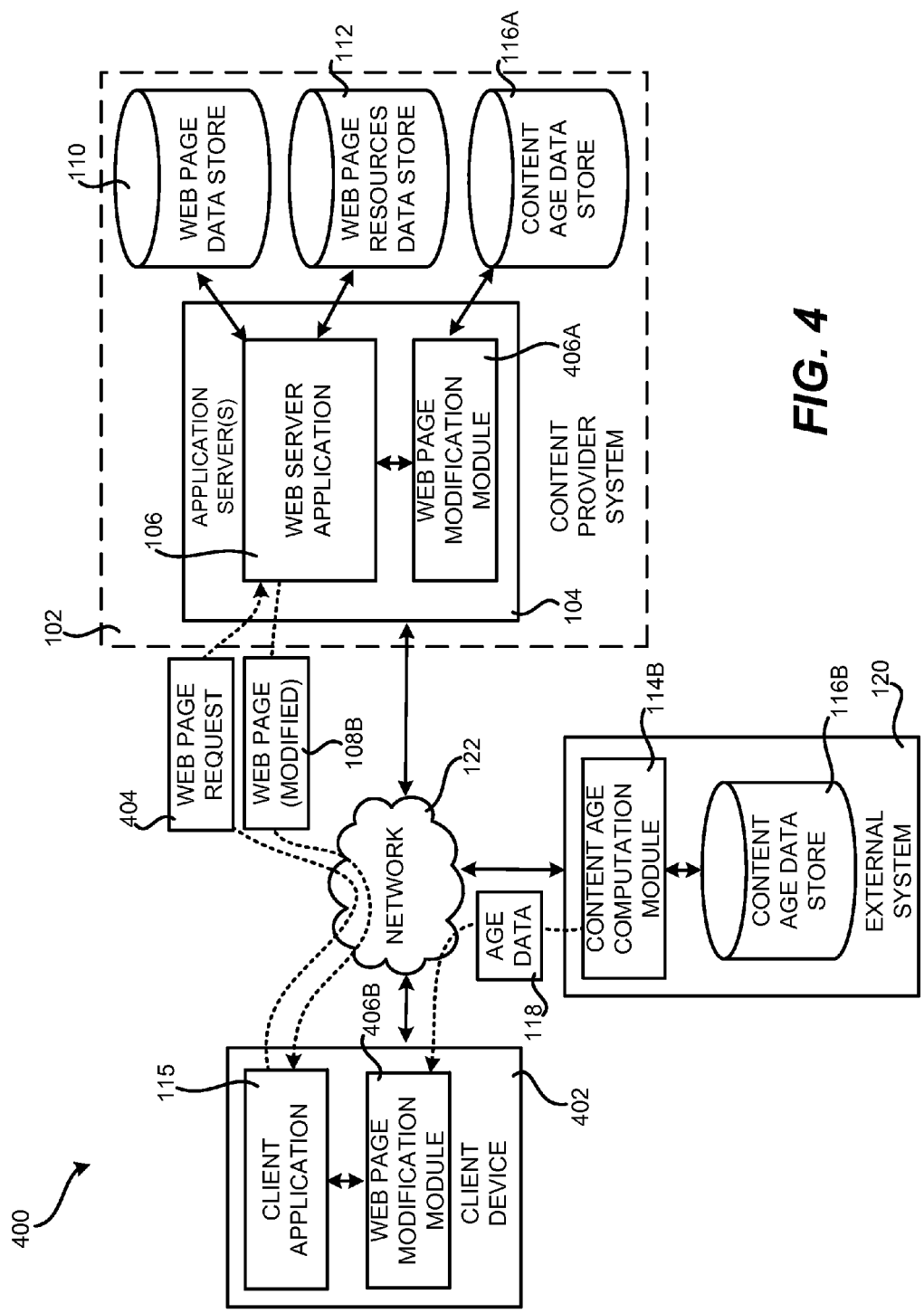
FIG. 4 is a system diagram showing an illustrative configuration for a content provider system that is configured to modify Web pages to visually indicate the age of elements contained therein, according to one embodiment disclosed herein.

FIG. 4 is a system diagram showing an illustrative configuration 400 for a content provider system 102 that is configured to modify Web pages 108 to visually indicate the age of elements contained therein, according to one embodiment disclosed herein. In the embodiment shown in FIG. 4, the content provider system 102 is configured with a Web page modification module 406A (which may be referred to as "the module 406A"). The module 406A executes on one or more of the application servers 104 and operates in conjunction with the Web server application 106 to modify Web pages such that the Web pages will visually indicate the age of the Web page elements generated thereby when rendered on a client device. Details regarding this process are provided below.

As shown in FIG. 4, a client device 402 may execute a client application 115. The client device 402 may be a personal computer ("PC"), a desktop workstation, a laptop, a notebook, a wireless telephone, a personal digital assistant ("PDA"), an e-reader, a game console, a set-top box, a consumer electronics device, a server computer, and the like. The client application 115 may be a Web browser application such as the INTERNET EXPLORER® internet browser from MICROSOFT Corporation of Redmond, Wash., the FIREFOX® web browser from MOZILLA Corporation of Mountain View, Calif., or any other web browser application known in the art. While the operating environment 400 illustrated in FIG. 4 shows only a single web browser application communicating with a single web server application 106, it will be appreciated that the embodiments described herein may be utilized with any number of client applications known in the art that access and retrieve web pages and/or other content from a remote server computer across a network. Additionally, it should be appreciated that the client application 115 might be virtually any another type of application capable of rendering content, such as a mobile application. It is intended that all such client application programs and remote server computers be included in the scope of this application.

The client application 115 may transmit a request 404 for a Web page 108 from the content provider system 102. In response to receiving the request 404, the Web server application 106 might retrieve and/or generate the requested Web page 108. Additionally, the Web page modification module 406A might modify the requested Web page 108. In particular, the module 406A might retrieve the ages of the Web page elements referenced by the requested Web page 108 from the content age data store 116A. The module 406A might then modify the Web page 108 such that the Web page 108 will visually indicate the ages of the Web page elements when rendered by the client application 115. For instance, the module 406A might specify style attributes in the Web page 108 for each Web page element that correspond to styles for visually indicating the ages of the various Web page elements.

In one embodiment, the requested Web page 108 is modified such that the Web page elements themselves are colored and/or shaded based upon their computed age. For instance, newer Web page elements may be colored green, while older Web page elements are colored red. In other embodiments, the requested Web page 108 may be modified such that a rectangle or other shaped region is placed around or on top of each Web page element that is colored and/or shaded based upon the age of the element that the shape encompasses. Virtually any number of colors and/or shades of colors might be utilized to indicate a range of ages of the elements. The requested Web page 108 might also be modified to provide other types of visual indications of the age of each of the Web page elements contained therein.

Figure 6:
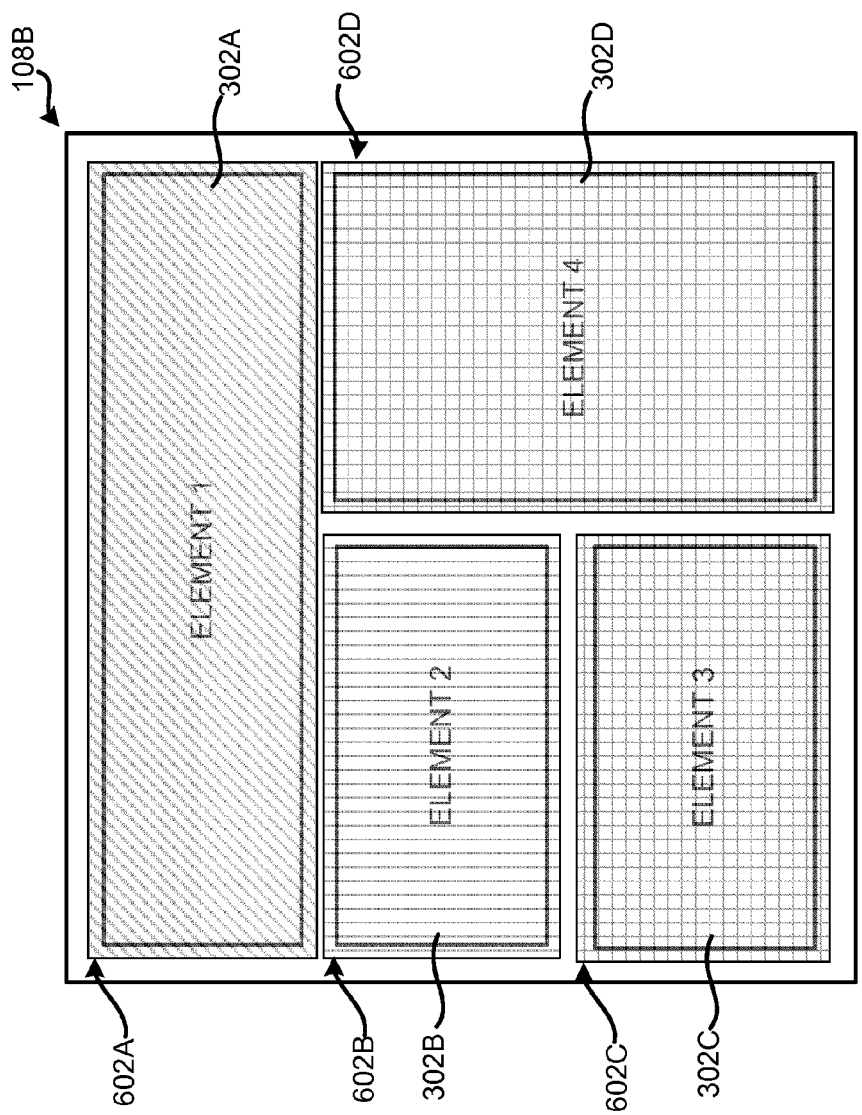
FIG. 6 is a user interface diagram showing a Web page that has been modified to visually indicate the age of elements contained therein, according to one embodiment disclosed herein.

Once the module 406 has modified the requested Web page in the manner described above, the modified Web page 108B is returned to the client application 115 in response to the Web page request 404. The client application 115 then renders the modified Web page 108B to show the requested Web page along with the visual indicators showing the ages of the various Web page elements generated by the Web page 108B. FIG. 6 is a user interface diagram showing a Web page 108B that has been modified to visually indicate the age of elements generated thereby.

As shown in FIG. 6, the Web page 108B has been rendered to show the Web page elements 302A-302D. The Web page 108B has also been rendered to visually indicate the age of each of the Web page elements 302A-302D. In the illustrative user interface shown in FIG. 6, rectangles 602A-602D have been rendered over the Web page elements 302A-302D, respectively. Each rectangle 602A-602D has been colored (indicated by the hatched lines in FIG. 6) to indicate the color of the Web page element 602 that it encompasses. As discussed above, other types of visual indicators might also be applied to the Web page elements 602 to indicate their age, such as a color border, coloring the Web page elements 602 themselves, and/or applying other visual effects based upon the age of each Web page element 602. In other embodiments, the age data 118 might be presented in a sidebar user interface control, in a report, a summary, as a gradient, or in a heat map. Other types of user interfaces might also be utilized.

In some embodiments, user interface controls might also be provided that allow a user to modify the manner in which the age data 118 is presented on a Web page 108. For example, user interface controls might be provided that allow the user to specify the color and/or type of shading applied to the Web page elements. In other embodiments, user interface controls might be provided that allow a user to specify that elements older than a specified age be hidden or visually de-emphasized. In a similar fashion, user interface controls might also be provided that allow a user to specify that elements that are younger than a specified age be visually emphasized. Other types of controls might also be provided for allowing a user to customize the manner in which the age data 118 is presented on a Web page.

It should be appreciated that modification of a requested Web page 108 need not occur at the content provider system 102. For instance, as also shown in FIG. 4, the Web page modification module 406B might also be executed at the client device 402. In this example, the Web page modification module 406B might be a plug-in to the client application 115 that has access to the Web page 108 once the page has been retrieved from the content provider system 102. In this example, the module 406B executing on the client device 402 might retrieve the age data 118 from a third-party, such as from the content age data store 116B maintained by the external system 120. In this manner, the concepts and technologies disclosed herein can be utilized with Web pages from virtually any content provider system. Other configurations will be apparent to those skilled in the art. Because the modules 406A and 406B perform the same functionality, as described above and below, these modules will be referred to generically below as "the module 406."

Figure 5:
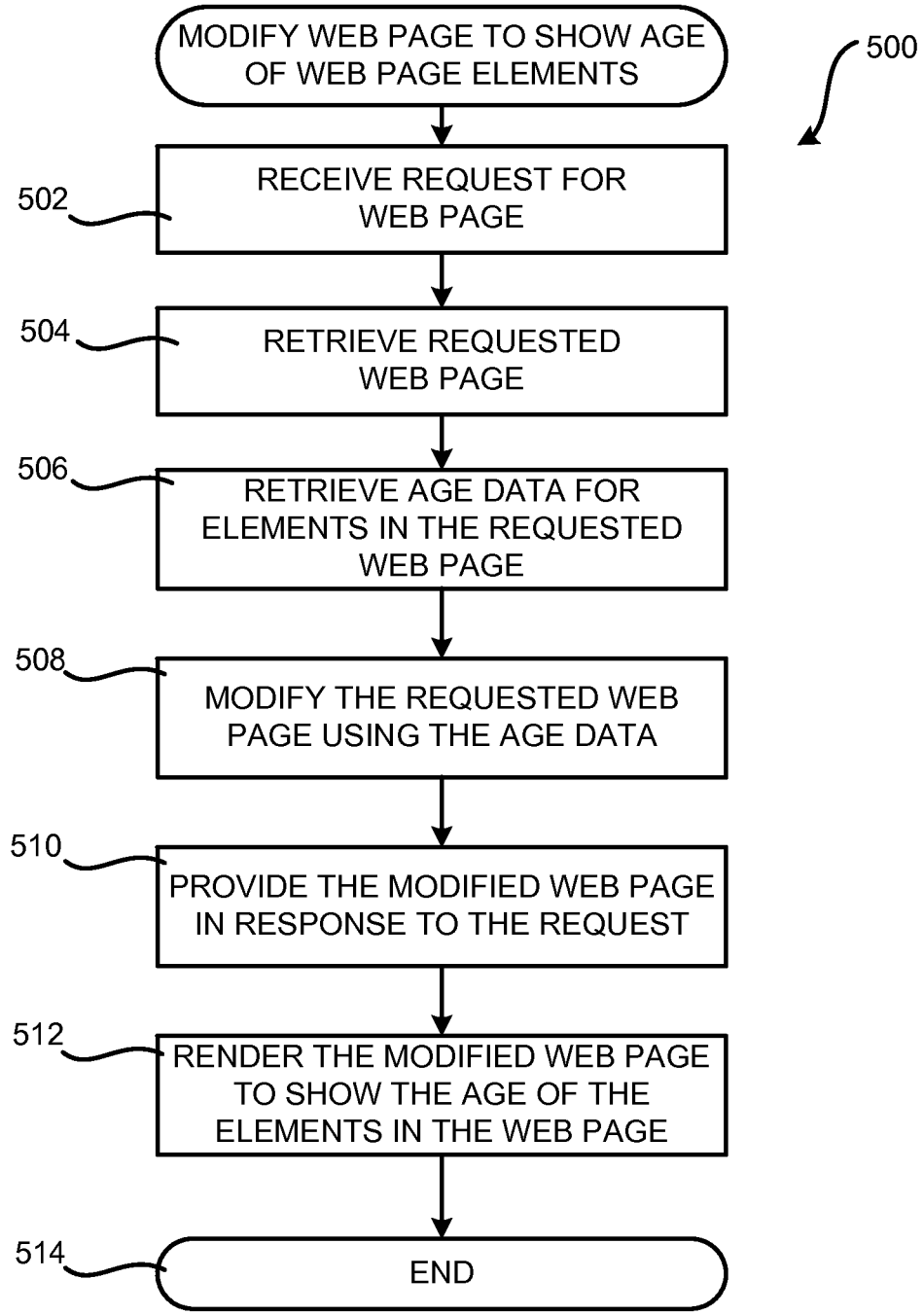
FIG. 5 is a flow diagram showing aspects of one illustrative routine for modifying Web pages to visually indicate the age of elements contained therein, according to one embodiment disclosed herein.

FIG. 5 is a flow diagram showing aspects of one illustrative routine 500 for modifying Web pages 108 to visually indicate the age of elements generated thereby, according to one embodiment disclosed herein. The routine 500 begins at operation 502, where the Web server application 106 receives a request 404 from the client application 115 for a Web page 108. In response to receiving the request 404, the routine 500 proceeds to operation 504 where the Web server application 106 retrieves the requested Web page 108 from the Web page data store 110. As discussed above, the Web server application 106 might dynamically generate all or a portion of the requested Web page 108.

From operation 504, the routine 500 proceeds to operation 506, where the Web page modification module 406A retrieves the age data 118 for the Web page elements in the requested Web page 108 from the content age data store 116A. The routine 500 then proceeds to operation 508, where the module 406A modifies the requested Web page 108 in the manner described above. Specifically the module 406A modifies the requested Web page 108 such that the ages of the Web page elements in the Web page will be visually presented when the Web page 108 is displayed by the client application 115. The Web server application 106 then provides the modified Web page 108B to the client application 115 in response to the Web page request 404. From operation 510, the routine 500 proceeds to operation 512, where the client application 115 receives and renders the modified Web page 108B. The routine 500 then proceeds from operation 512 to operation 514, where it ends.

Figure 7:
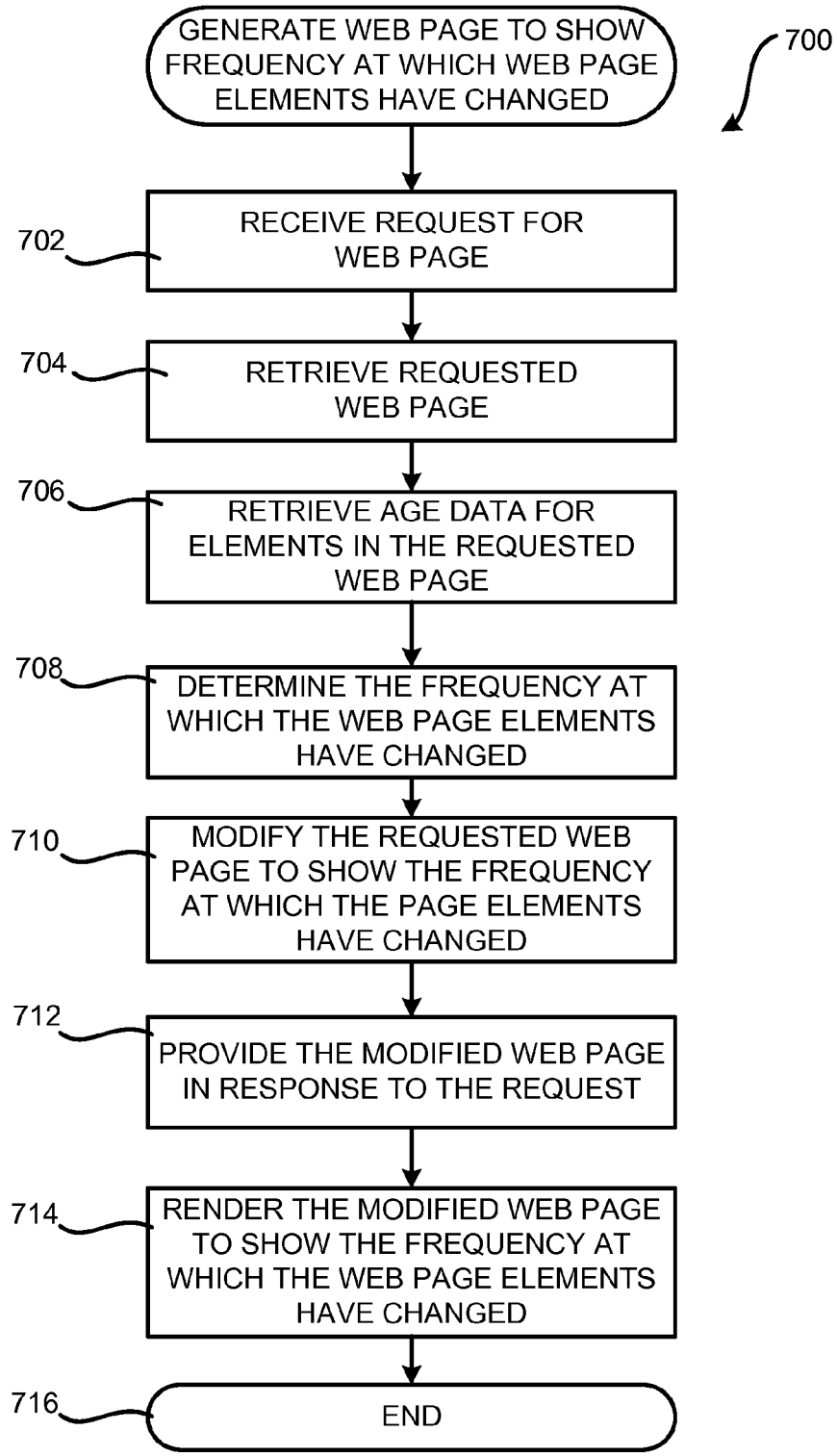
FIG. 7 is a flow diagram showing aspects of one illustrative routine for modifying Web pages to visually indicate the frequency at which elements contained therein have changed, according to one embodiment disclosed herein.

FIG. 7 is a flow diagram showing aspects of one illustrative routine 700 for modifying Web pages 108 to visually indicate the frequency at which elements generated thereby have changed, according to one embodiment disclosed herein. In this embodiment, the Web page modification module 406 is configured to modify a requested Web page 108 such that the frequency that each Web page element in the page has been updated is visually presented when the Web page 108 is rendered at a client device.

For example, the Web page elements themselves may be colored and/or shaded based upon the frequency at which they have been updated. In other embodiments, a rectangle or other shaped region may be placed around or on top of each element that is colored and/or shaded based upon the frequency at which the element that the shape encompasses has been updated. A Web page 108 might also be modified to provide other types of visual indications of the frequency at which the Web page elements in the page have been updated. For instance, the frequency information might be also presented in a sidebar user interface control, in a report, a summary, as a gradient, or in a heat map. Other types of user interfaces might also be utilized. In order to provide this functionality, the content age computation module 114 may maintain historical information describing the modification of Web page elements.

The routine 700 begins at operation 702, where the Web server application 106 receives a request 404 from the client application 115 for a Web page 108. In response to receiving the request 404, the routine 700 proceeds to operation 704 where the Web server application 106 retrieves the requested Web page 108 from the Web page data store 110. As discussed above, the Web server application 106 might dynamically generate all or a portion of the requested Web page 108.

From operation 704, the routine 700 proceeds to operation 706, where the Web page modification module 406A retrieves the age data 118 for the Web page elements in the requested Web page 108 from the content age data store 116A. The routine 700 then proceeds to operation 708, where the module 114 determines the frequency at which the Web page elements have changed based upon the stored age data 118.

From operation 708, the routine 700 proceeds to operation 710 where the module 406A modifies the requested Web page 108 such that the frequencies at which the Web page elements in the Web page have been modified will be visually presented when the Web page 108 is displayed by the client application 115. The Web server application 106 then provides the modified Web page 108B to the client application 115 in response to the Web page request 404 at operation 712. From operation 712, the routine 700 proceeds to operation 714, where the client application 115 receives and renders the modified Web page. The routine 700 then proceeds from operation 714 to operation 716, where it ends.

Figure 8:
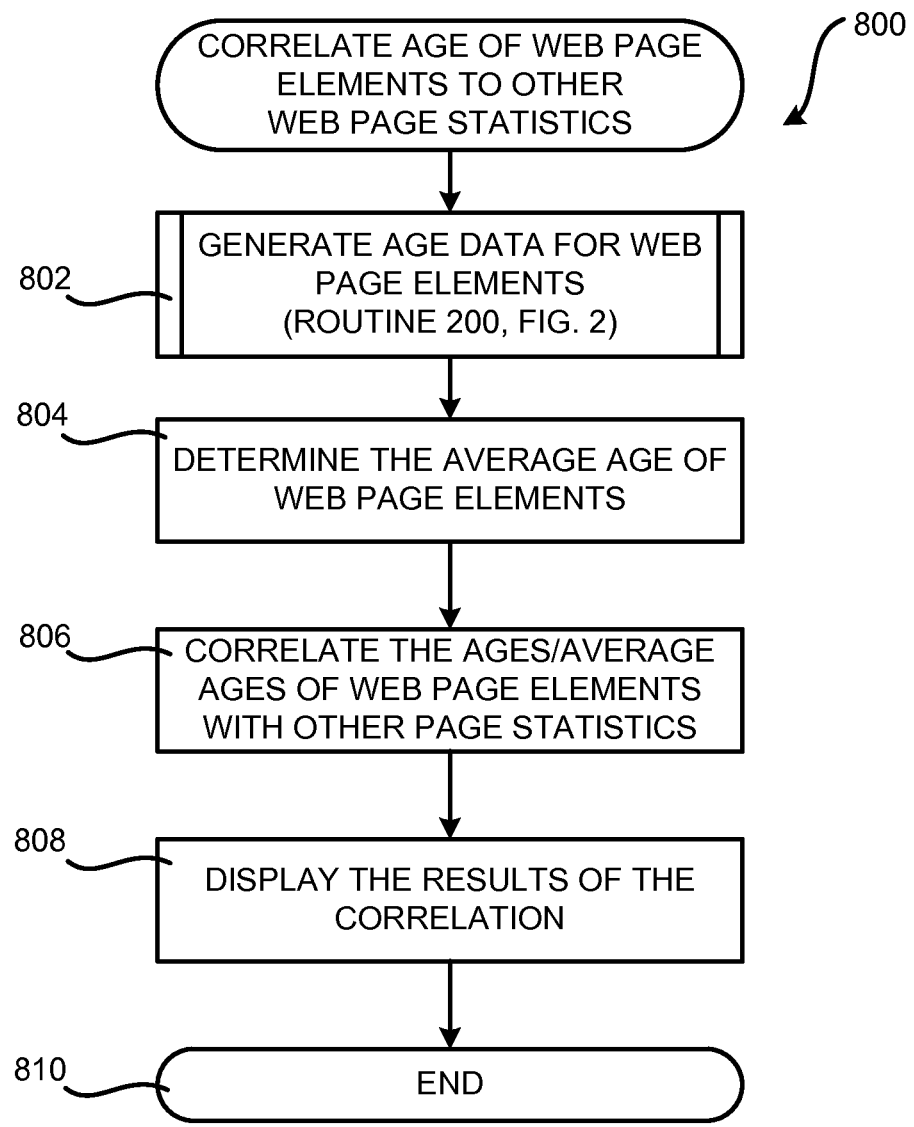
FIG. 8 is a flow diagram showing aspects of one illustrative routine for correlating the age of Web page elements to other Web page statistics, according to one embodiment disclosed herein.

FIG. 8 is a flow diagram showing aspects of one illustrative routine 800 for correlating the age of Web page elements to other Web page statistics, according to one embodiment disclosed herein. The routine 800 begins at operation 802, where the age data 118 for Web page elements in a Web page is generated in the manner described above with regard to FIGS. 1-3. As mentioned above, the ages of Web page elements in a Web page 108 might be computed in other ways.

From operation 802, the routine 800 proceeds to operation 804, where the average age of Web page elements in an area of the Web page 108 might be computed. For example, the average age of Web page elements on the left, right, top, or bottom of the Web page might be computed.

From operation 804, the routine 800 proceeds to operation 806, where the ages of the Web page elements and/or the average ages of Web page elements in a particular area may be correlated to other Web page statistics maintained by the content provider system 102. For example, the average age of Web page elements within an area may be correlated with data describing the number of clicks that the area received within a particular period.

According to embodiments, an assertion may be tested by correlating the age data with other statistics in the manner described above. For instance, a determination may be made as to whether areas with content having lower or higher average ages are likely to receive a greater number of clicks. Other types of correlations may be made and other types of assertions might also be tested in other embodiments. From operation 806, the routine 800 proceeds to operation 808, where the results of the correlation of the age and other Web page statistics may be displayed. The routine 800 then proceeds to operation 810, where it ends.

Figure 9:
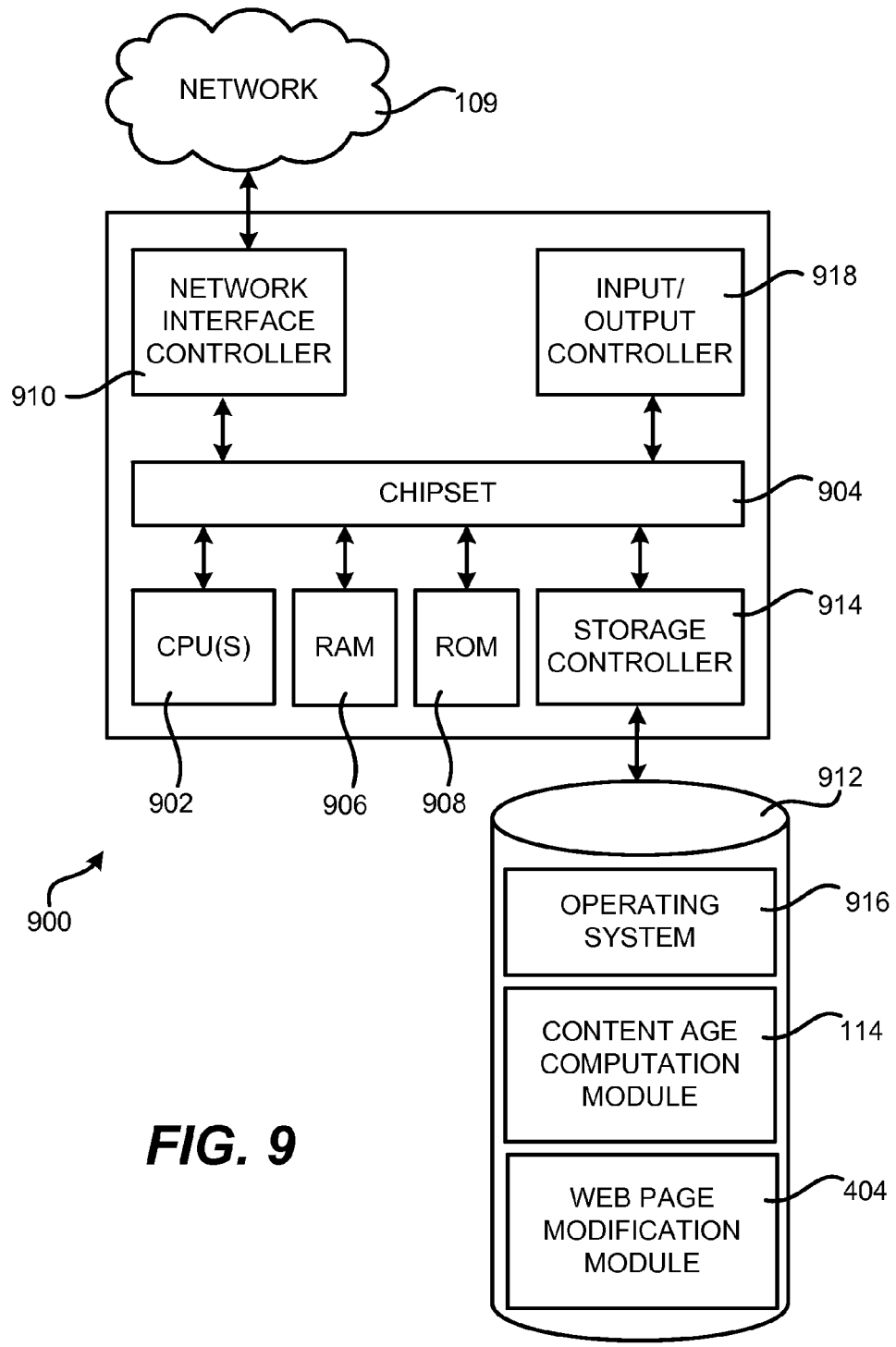
FIG. 9 is a computer architecture diagram showing one illustrative computer hardware architecture for use in computing devices configured to implement the concepts and technologies disclosed herein in one embodiment.

FIG. 9 shows an example computer architecture for a computer 900 capable of executing the software components described herein for calculating and visualizing the age of content in the manner presented above. The computer architecture shown in FIG. 9 illustrates a conventional server computer, workstation, desktop computer, laptop, PDA, electronic book reader, digital wireless phone, tablet computer, network appliance, set-top box, or other computing device. The computer architecture may be utilized to execute any aspects of the software components described herein as executing on the content provider system 102, the external system 120, the client device 402, or other computing platform.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 904. The CPUs 902 are standard programmable processors that perform arithmetic and logical operations necessary for the operation of the computer 900.

The CPUs 902 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that that help to startup the computer 900 and to transfer information between the various components and devices. The ROM 908 or NVRAM may also store other software components necessary for the operation of the computer 900 in accordance with the embodiments described herein.

According to various embodiments, the computer 900 may operate in a networked environment using logical connections to remote computing devices and computer systems through a network, such as a local-area network ("LAN"), a wide-area network ("WAN"), the Internet, or any other networking topology known in the art that connects the computer 900 to remote computers. The chipset 904 includes functionality for providing network connectivity through a network interface controller ("NIC") 910, such as a gigabit Ethernet adapter.

For example, the NIC 910 may be capable of connecting the computer 900 to other computing devices, such as the application servers 104, the client device 402, a data storage system in the content provider system 102, and the like, over the network 122 described above in regard to FIG. 1. It should be appreciated that multiple NICs 910 may be present in the computer 900, connecting the computer to other types of networks and remote computer systems.

The computer 900 may be connected to a mass storage device 912 that provides non-volatile storage for the computer. The mass storage device 912 may store system programs, application programs, other program modules, and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage, or the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 might have access to other computer-readable media to store and retrieve information, such as program modules, data structures, or other data. Embodiments may be provided as a computer program product including a nontransitory machine-readable storage medium having stored thereon instructions (in compressed or uncompressed form) that may be used to program a computer (or other electronic device) to perform processes or methods described herein.

The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The mass storage device 912 may store an operating system 916 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 912 may store other system or application programs and data utilized by the computer 900. For instance, when utilized to implement the client device 402, the mass storage device 912 may store the client application 115 and/or the Web page modification module 406. When utilized to implement one or more of the application servers 110, the mass storage device 912 may store the content age computing module 114 and/or the Web page modification module 406. The mass storage device 912 may also store other programs and data.

In one embodiment, the mass storage device 912 or other computer-readable storage media may be encoded with computer-executable instructions that, when loaded into the computer 900, transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 has access to computer-readable storage media storing computer-executable instructions that, when executed by the computer, perform the various routines and operations described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 may provide output to a display device, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for calculating and visualizing the age of content have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for visualizing an age of content in a Web page, the computer-implemented method comprising executing instructions in a computer system to perform the operations of:
    identifying one or more elements in the Web page for which age is to be tracked based upon data contained in the Web page identifying the one or more elements for which age is to be tracked;
    for individual elements in the Web page for which age is to be tracked, periodically calculating the age of the one or more elements and storing age data describing the age of the one or more elements;
    receiving a request for the Web page from a client device;
    in response to receiving the request for the Web page from the client device, utilizing the age data for the one or more elements in the Web page to generate a modified Web page which, when rendered by the client device, will cause the calculated age of the one or more elements to be presented visually by causing the one or more elements to be displayed in association with colored regions corresponding to the ages of the one or more elements; and
    returning the modified Web page to the client device in response to the request.

2. The computer-implemented method of claim 1, wherein utilizing the age data for the one or more elements in the Web page to generate a modified Web page which, when rendered by the client device, will cause the calculated age of the one or more elements to be presented visually by causing the one or more elements to be displayed in colors that correspond to the ages of the one or more elements.

3. The computer-implemented method of claim 1, wherein utilizing the age data for the one or more elements in the Web page to generate a modified Web page which, when rendered by the client device, will cause the calculated age of the one or more elements to be presented visually by causing the one or more elements to be displayed within borders that are colored corresponding to the ages of the one or more elements.

4. The computer-implemented method of claim 1, wherein calculating the age of the one or more elements comprises computing and storing a checksum for the one or more elements, re-computing the checksums, comparing the stored checksum to the re-computed checksum for each element to determine if the checksum has changed, increasing the age of any element for which the checksum has not changed, and resetting the age of any element for which the checksum has changed.

5. The computer-implemented method of claim 4, wherein calculating the age of the one or more elements further comprises storing the re-computed checksum for each element for which the checksum has changed.

6. The computer-implemented method of claim 1, further comprising:
    in response to receiving the request for the Web page from the client device, providing a response to the request by presenting a frequency at which the one or more elements have been changed with the content when the elements are rendered;
    correlating the age data for the one or more elements to one or more other statistics regarding the one or more elements; and
    presenting results of the correlation.

7. A computer-readable storage medium having computer-executable instructions stored thereupon which, when executed by the computer, cause the computer to:
    identify one or more elements in a network accessible content resource for which age is to be tracked based upon data contained in the network accessible content resource identifying the one or more elements for which age is to be tracked;
    compute an age of the identified one or more elements in the network accessible content resource for which age is to be tracked, and
    store age data describing the computed age of the one or more elements, wherein the age data is configured for use in modifying the one or more elements such that the computed age of the one or more elements will be presented visually when the elements are rendered, and wherein the elements are modified with the age data so that the one or more elements are displayed in association with colored regions corresponding to the age of the one or more elements.

8. The computer-readable storage medium of claim 7, wherein compute an age of one or more elements comprises:
    compute an age of one or more elements by computing and storing a checksum for the one or more elements, re-computing the checksums, comparing the stored checksum to the re-computed checksum for each element to determine if the checksum has changed, increasing the age of any element for which the checksum has not changed, and resetting the age of any element for which the checksum has changed.

9. The computer-readable storage medium of claim 8, having further computer-executable instructions stored thereupon which, when executed by the computer, cause the computer to store the re-computed checksum for each element for which the checksum has changed.

10. The computer-readable storage medium of claim 7, having further computer-executable instructions stored thereupon which, when executed by the computer, cause the computer to:
    in response to receiving a request for the network accessible content resource, modify the elements using the age data so that a frequency at which the one or more elements have been changed will be presented visually when the elements are rendered.

11. The computer-readable storage medium of claim 7, having further computer-executable instructions stored thereupon which, when executed by the computer, cause the computer to:
    correlate the age data for the one or more elements to one or more other statistics regarding the one or more elements; and
    cause results of the correlation to be presented.

12. The computer-readable storage medium of claim 7, wherein the network accessible content resource is a Web page.

13. An apparatus for visualizing an age of visually perceptible content, the apparatus comprising:
- at least one processor; and
- a computer-readable storage medium having computer-executable instructions stored thereupon which, when executed on the at least one processor, cause the apparatus to
- identify one or more elements in a page for which age is to be tracked based upon data contained in the page that identifies elements of the page for which age is to be tracked, the one or more elements in the page being configured to generate the visually perceptible content when rendered,
- store age data describing the age of the identified one or more elements,
- receive a request for the elements, and
- provide a response to the request that is configured to present the age of the one or more elements along with the visually perceptible content by causing the one or more elements to be presented in association with regions that are colored or shaded based upon the age of the one or more elements.

14. The apparatus of claim 13, wherein the computer-readable storage medium has further computer-executable instructions stored thereupon which, when executed on the at least one processor, cause the apparatus to periodically compute the age data.

15. The apparatus of claim 13, wherein the computer-readable storage medium has further computer-executable instructions stored thereupon which, when executed on the at least one processor, cause the apparatus to generate the age data when the request for the elements is received.

16. The apparatus of claim 13, wherein the computer-readable storage medium has further computer-executable instructions stored thereupon which, when executed on the at least one processor, cause the apparatus to generate the age data for the one or more elements by computing and storing a checksum for each of the elements, periodically re-computing the checksums, comparing the stored checksum to the re-computed checksum for each element to determine if the checksum has changed, increasing the age of any element for which the checksum has not changed, and resetting the age of any element for which the checksum has changed.

17. The apparatus of claim 13, wherein the computer-readable storage medium has further computer-executable instructions stored thereupon which, when executed on the at least one processor, cause the apparatus to provide a response to the request by presenting the frequency at which the one or more elements have been changed with the visually perceptible content when the elements are rendered.

18. The apparatus of claim 13, wherein the computer-readable storage medium has further computer-executable instructions stored thereupon which, when executed on the at least one processor, cause the apparatus to:
- correlate the age data for the one or more elements to one or more other statistics regarding the one or more elements; and
- present results of the correlation.

19. The apparatus of claim 13, wherein the computer-readable storage medium has further computer-executable instructions stored thereupon which, when executed on the at least one processor, cause the apparatus to present the age data such that the one or more elements are colored or shaded based upon the age of the one or more elements.

20. The apparatus of claim 13, wherein the page comprises a Web page.

* * * * *